(12) United States Patent
Watanabe et al.

(10) Patent No.: US 11,267,381 B2
(45) Date of Patent: Mar. 8, 2022

(54) VEHICLE SEAT

(71) Applicant: NHK Spring Co., Ltd., Yokohama (JP)

(72) Inventors: Takehiro Watanabe, Yokohama (JP); Tomoharu Nakamura, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 63 days.

(21) Appl. No.: 16/825,117

(22) Filed: Mar. 20, 2020

(65) Prior Publication Data
US 2020/0307430 A1 Oct. 1, 2020

(30) Foreign Application Priority Data

Mar. 25, 2019 (JP) .............................. JP2019-057346

(51) Int. Cl.
*B60N 2/68* (2006.01)
*B60N 2/42* (2006.01)
*B60N 2/72* (2006.01)
*B60N 2/427* (2006.01)
*B60N 2/64* (2006.01)

(52) U.S. Cl.
CPC .......... *B60N 2/686* (2013.01); *B60N 2/4228* (2013.01); *B60N 2/42709* (2013.01); *B60N 2/64* (2013.01); *B60N 2/72* (2013.01); *B60N 2002/684* (2013.01); *B60N 2205/30* (2013.01)

(58) Field of Classification Search
CPC .............................. B60N 2/686; B60N 2/4228

USPC ......................................... 297/216.13, 216.14
See application file for complete search history.

(56) References Cited

U.S. PATENT DOCUMENTS

| 7,222,915 B2 * | 5/2007 | Philippot | ................. | B60N 2/70 297/216.13 |
| 9,809,139 B2 * | 11/2017 | Saada | .................. | B60N 2/4221 |
| 2016/0046379 A1 * | 2/2016 | Saada | .................. | B60N 2/4221 297/216.14 X |

FOREIGN PATENT DOCUMENTS

JP          2010208481          9/2010

* cited by examiner

*Primary Examiner* — Anthony D Barfield
(74) *Attorney, Agent, or Firm* — Dority & Manning, P.A.

(57) ABSTRACT

There is provided a vehicle seat including: a seat back frame standing from a seat rear end side of a seat cushion, a left and right pair of cushion frames, the seat back frame being supported to be tiltable in a seat front-and-rear direction, and the seat back frame structuring a framework of a seat back; and a seat back panel that is provided at the seat rear side of the seat back frame, an upper frame structuring an upper end portion at the seat rear side of the seat back frame, an upper end portion of the seat back panel being disposed at the seat upper side relative to the upper frame, and the seat back panel displacing toward the seat lower side when an impact load is applied from the upper side of the seat back.

11 Claims, 9 Drawing Sheets

VEHICLE SEAT

CROSS-REFERENCE TO RELATED APPLICATION

This application is based on and claims priority under 35 USC 119 from Japanese Patent Application No. 2019-057346 filed on Mar. 25, 2019, the disclosure of which is incorporated by reference herein.

BACKGROUND

Technical Field

The present invention relates to a vehicle seat.

Related Art

Japanese Patent Application Laid-Open (JP-A) No. 2010-208481 discloses a vehicle seat structure in which a seat back of a front seat is divided into a lower seat back and an upper seat back. According to this vehicle seat structure, the knees of a seat occupant of a rear seat, who is moved forward during a frontal collision, push against a lever member provided at the lower seat back of the front seat. Consequently, a driving gear linked with the lever member rotates and a driven gear, which is provided at a rotation center of the upper seat back and meshes with the driving gear, also rotates. The upper seat back is tilted forward by the rotation of the driven gear, away from a path that the head area of the seat occupant of the rear seat will follow. As a result, an impact that the head area of the occupant sitting on the rear seat receives may be moderated.

However, in the vehicle seat recited in JP-A No. 2010-208481, as well as it being necessary to provide a divided seat back frame, it is necessary to provide additional components such as gears and the like. Therefore, the number of components is increased and fabrication costs are increased.

Accordingly, it is desirable to structure a vehicle seat that, as well as suppressing an increase in the number of components, may moderate an impact received by the head area of an occupant sitting on a rear seat.

SUMMARY

In consideration of the circumstances described above, an object of the present invention is to provide a vehicle seat that may both suppress an increase in a number of components and moderate an impact received by the head area of an occupant sitting on a rear seat.

A vehicle seat according to a first aspect of the present invention includes: a seat back frame standing from a seat rear end side of a seat cushion that supports a buttock area and thigh area of a seat occupant, a left and right pair of cushion frames structuring a framework of the seat cushion, the seat back frame being supported to be tiltable in a seat front-and-rear direction about a center of rotation at a side of the seat back frame at which a connection portion thereof with the cushion frames is disposed, and the seat back frame structuring a framework of a seat back that supports a back area of the seat occupant; and a seat back panel that is provided at the seat rear side of the seat back frame, an upper frame structuring an upper end portion at the seat rear side of the seat back frame, an upper end portion of the seat back panel being disposed at the seat upper side relative to the upper frame, and the seat back panel displacing toward the seat lower side when an impact load is applied from the upper side of the seat back.

According to the vehicle seat of the first aspect of the present invention, the seat back panel is provided at the seat rear side of the seat back frame. The upper end portion of the seat back panel is disposed at the seat upper side relative to the upper frame that forms the upper end portion of the seat rear side of the seat back frame. When an impact load is applied from the upper side of the seat back, the seat back panel displaces to the seat lower side. Therefore, during a frontal collision, the head area of a seat occupant of a rear seat who is moving toward the seat front side may make contact with the upper end portion of the seat back panel. Therefore, an impact against the head area of the seat occupant may be moderated compared to a situation in which the head area of a seat occupant of a rear seat first makes contact with a seat back frame. Moreover, because the seat back panel displaces toward the seat lower side, a reaction force against the head area of the seat occupant from the seat back panel with which the head area of the seat occupant makes contact may be suppressed. For these reasons, an impact that the head area of the occupant sitting on the rear seat receives may be moderated.

According to the vehicle seat of the first aspect of the present invention, this structure is simply provided with the seat back panel at the seat rear side of the seat back frame. Thus, a vehicle seat may be structured that both suppresses an increase in a number of components and moderates an impact received by the head area of an occupant sitting on a rear seat.

In a vehicle seat according to a second aspect of the present invention, in the vehicle seat according to the first aspect, the seat back panel detaches from the seat back frame when the seat back panel displaces toward the seat lower side.

According to the vehicle seat of the second aspect of the present invention, the seat back panel detaches from the seat back frame when the seat back panel has displaced to the seat lower side. Therefore, the seat back panel may be detached from the seat back frame when the head area of a seat occupant has made contact and the seat back panel has displaced to the seat lower side. Therefore, a reaction force against the head area of the seat occupant from the seat back panel may be more assuredly suppressed.

In a vehicle seat according to a third aspect of the present invention, in the vehicle seat according to the first aspect or the second aspect, the seat back panel includes a first attachment portion that, as a result of being attached to the seat back frame, disposes the upper end portion of the seat back panel at the seat upper side relative to the upper frame.

According to the vehicle seat of the third aspect of the present invention, the seat vertical direction position of the seat back panel is set by the first attachment portion being attached to the seat back frame. Therefore, the upper end portion of the seat back panel may be assuredly disposed at the seat upper side relative to the upper frame.

In a vehicle seat according to a fourth aspect of the present invention, in the vehicle seat according to any one of the first to third aspects, the seat back panel includes a second attachment portion that, as a result of being attached to the seat back frame, sets a seat width direction position of the seat back panel relative to the seat back frame.

According to the vehicle seat of the fourth aspect of the present invention, the seat width direction position of the seat back panel relative to the seat back frame is set by the second attachment portion being attached to the seat back frame. Therefore, the position of the seat back panel in the seat width direction may be set appropriately, and when the head area of a seat occupant makes contact with the seat back panel, displacement in the seat width direction may be suppressed and the seat back panel may be displaced to the seat lower side. As a result, an impact that the head area of the occupant sitting on the rear seat receives may be moderated.

In a vehicle seat according to a fifth aspect of the present invention, in the vehicle seat according to the fourth aspect, the seat back panel is attached to the seat back frame by a fastening member being inserted into a hole formed in the second attachment portion, the hole being formed as a long hole with a length in the seat vertical direction that is greater than an outer diameter of a shaft portion of the fastening member.

According to the vehicle seat of the fifth aspect of the present invention, the seat back panel is attached to the seat back frame by the fastening member being inserted into the hole formed in the second attachment portion. This hole is formed as a long hole with a length in the seat vertical direction that is greater than the outer diameter of the rod portion of the fastening member. Therefore, the seat back panel may be displaced in the seat vertical direction when the head area of a seat occupant makes contact with the upper end portion of the seat back panel. Thus, the seat back panel may be more assuredly displaced to the seat lower side.

In a vehicle seat according to a sixth aspect of the present invention, in the vehicle seat according to the third aspect, the seat back panel is attached to the seat back frame by a resin clip, a shaft portion of the resin clip being inserted into the first attachment portion, the resin clip including a retention portion at a distal end of the shaft portion, the retention portion retaining a wire that spans across the seat back frame in the seat width direction, and the resin clip detaching from the wire by resilient deformation when the seat back panel displaces toward the seat lower side.

According to the vehicle seat of the sixth aspect of the present invention, the seat back panel is attached to the seat back frame by the resin clip inserted into the first attachment portion. The resin clip is provided, at the distal end of the shaft portion, with the retaining portion that is for retaining the wire that spans across the seat back frame in the seat width direction. When the seat back panel is displaced to the seat lower side, the resin clip detaches from the wire by resilient deformation. Therefore, the seat vertical direction position of the seat back panel relative to the seat back frame may be set, and when the head area of a seat occupant makes contact with the upper end portion of the seat back panel, the seat back panel may be detached by the resin clip detaching. Thus, a reaction force against the head area of the seat occupant from the seat back panel may be more assuredly suppressed.

In a vehicle seat according to a seventh aspect of the present invention, in the vehicle seat according to any one of the first to sixth aspects, an edge guard is provided at an outer edge portion at the seat upper side of the seat back panel, the edge guard being disposed along the seat width direction so as to cover the outer edge portion, a top portion of the edge guard covering an upper end of the seat back panel, a general portion of the edge guard covering the seat front side of a portion of the seat back panel, and the top portion being formed with a greater plate thickness than the general portion.

According to the vehicle seat of the seventh aspect of the present invention, of the edge guard provided at the outer edge portion at the seat upper side of the seat back panel, the top portion covering the upper end of the seat back panel is formed with a greater plate thickness than the general portion covering the seat front side of the seat back panel. Therefore, a seat vertical direction position of the upper end portion of the seat back panel at which the edge guard is provided may be elevated by altering the plate thickness of the top portion, and a timing at which the head area of a seat occupant makes contact with the seat back panel may be regulated.

As described above, a vehicle seat according to the present invention has excellent effects in that both an increase in a number of components may be suppressed and an impact received by the head area of an occupant sitting on a rear seat may be moderated.

BRIEF DESCRIPTION OF THE DRAWINGS

Exemplary embodiments of the present invention will be described in detail based on the following figures, wherein.

DETAILED DESCRIPTION

Figure 1:
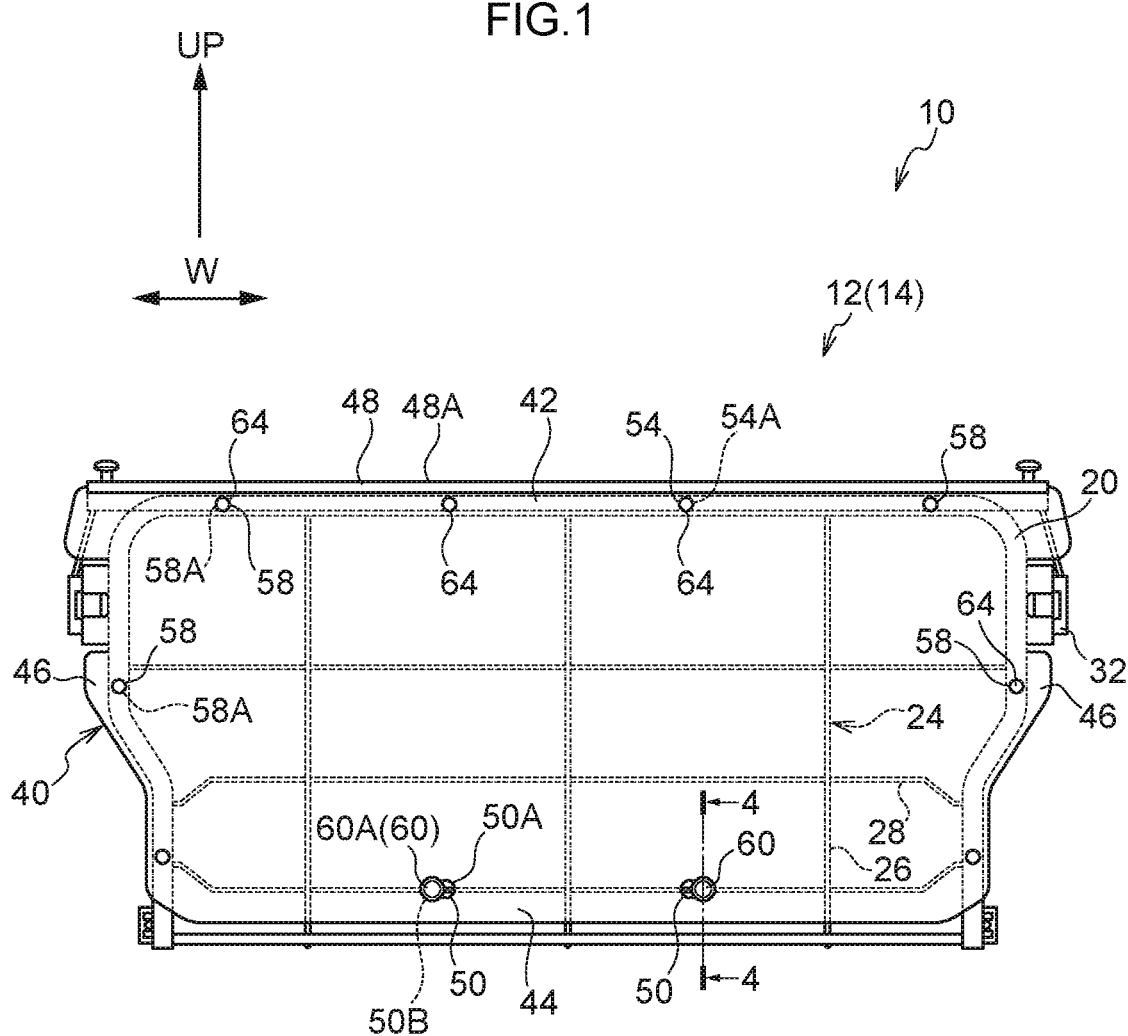
FIG. 1 is a rear view in which a seat back panel attached to a seat back frame according to a present exemplary embodiment is seen from a vehicle rear side.
Figure 2:
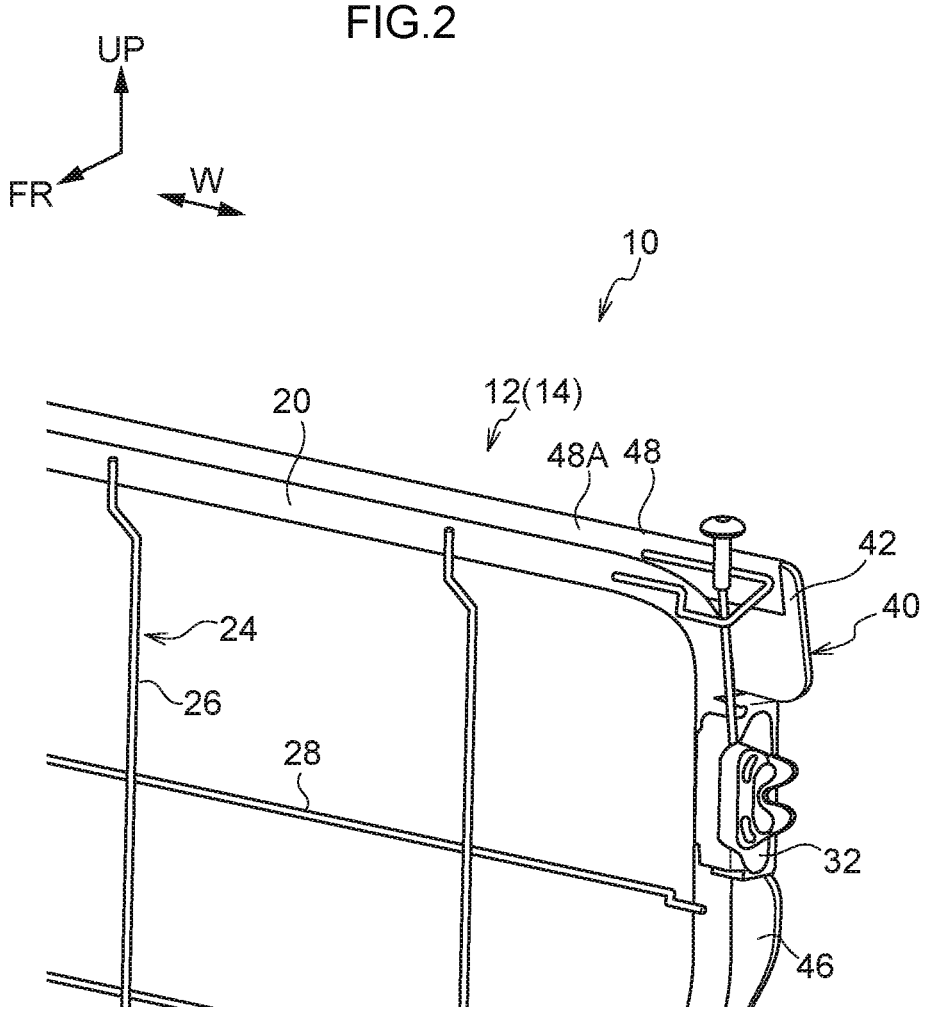
FIG. 2 is a perspective view in which a vehicle width direction end portion of the seat back panel according to the present exemplary embodiment is seen from the vehicle front side.

Below, a vehicle seat 10, which is an example of an embodiment of the present invention, is described using FIG. 1 to FIG. 7. In the drawings, an arrow FR indicates a seat front side, an arrow UP indicates a seat upper side, and an arrow W indicates a seat width direction. In the present exemplary embodiment, the front side, upper side and width direction of the vehicle seat 10 match a front side, upper side and width direction of a vehicle.

Figure 5:
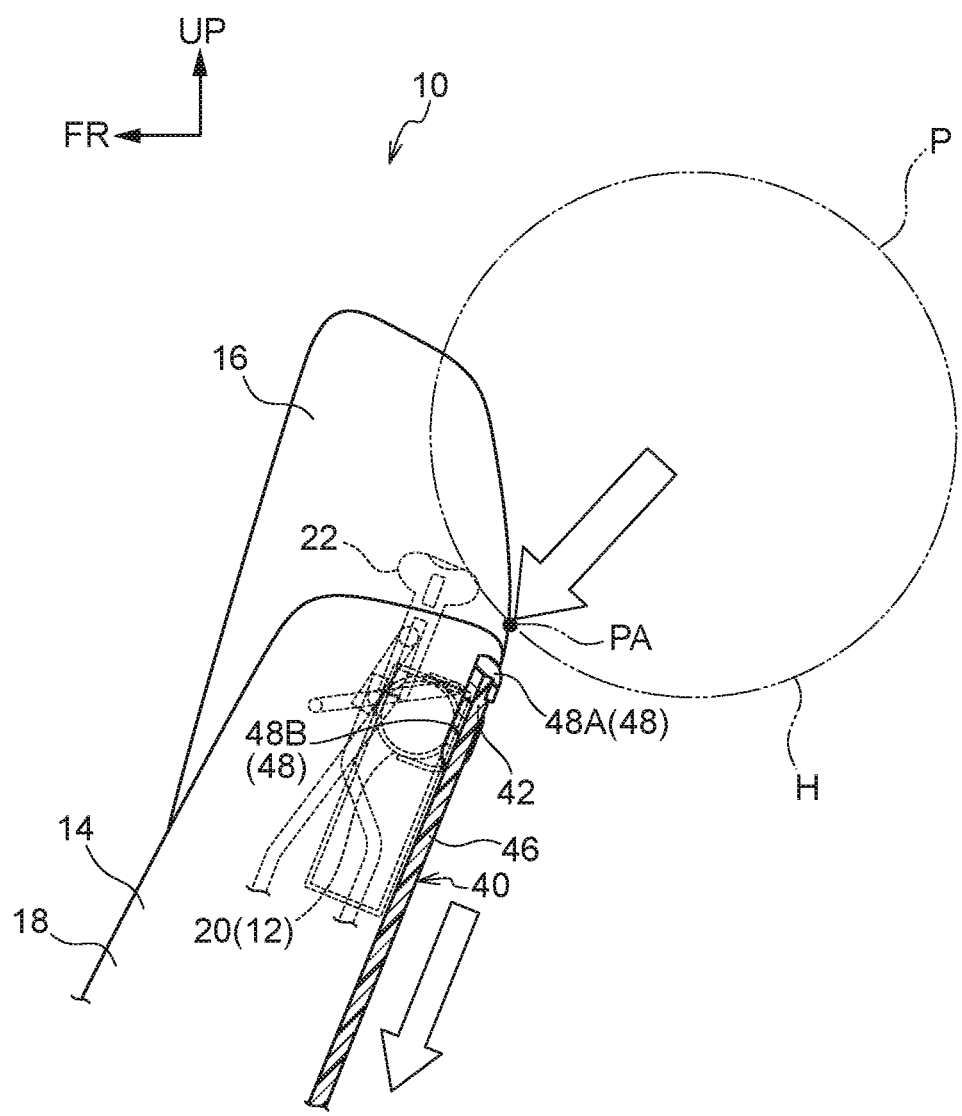
FIG. 5 is a side view showing a state in which a load from the vehicle rear side is applied to a vehicle seat according to the present exemplary embodiment.

FIG. 1 shows a seat upper side of a seat back frame 12 structuring the vehicle seat 10 in a rear view. As shown in FIG. 5, the vehicle seat 10 includes a seat cushion (not shown in the drawings) for supporting the buttock area and thigh area of an occupant, a seat back 14 for supporting the back area of the occupant, and a headrest 16 for supporting the head area of the occupant. The seat back 14 stands from the seat rear end side of the seat cushion. The seat back 14 is supported to be tiltable in the seat front-and-rear direction about a side of the seat back 14 at which a connection portion with a cushion frame is disposed. The seat back 14 standing from the seat rear end side of the seat cushion is formed with a back pad 18 attached to the seat back frame 12, which structures a framework of the seat back 14.

As shown in FIG. 1, the seat back frame 12 includes a left and right pair of back side frames (not shown in the drawings), which are provided at both ends in the seat width direction at the seat lower side of the seat back frame 12, and an upper pipe 20, which is provided at the seat upper side of the seat back frame 12 and serves as an upper frame. The back side frames are formed of steel plates with plate thickness directions in the seat width direction, and the back side frames extend in the seat vertical direction.

The upper pipe 20 is formed in a tubular shape of a metal material. The upper pipe 20 extends in the seat width direction at the seat upper side, and the upper pipe 20 extends toward the seat lower side from seat width direction two end portions of the seat upper side. Lower end portions of the upper pipe 20 extending to the seat lower side are connected to corresponding upper end portions of the left and right pair of back side frames. A headrest frame 22 (see FIG. 5) that structures a framework of the headrest 16 is connected to the upper pipe 20.

A seat back spring 24 spanning between seat width direction two end portions of the upper pipe 20 is provided at the seat lower side of the headrest frame 22. The seat back spring 24 is constituted by vertical wire portions 26 and horizontal wire portions 28. Plural wires that are the vertical wire portions 26 span across from an upper end portion of the upper pipe 20 to the seat lower side of the upper pipe 20. Plural wires that are the horizontal wire portions 28 span across between the seat width direction two end portions of the upper pipe 20. Cushion attachment portions 32 are provided at the seat upper side of the seat width direction two end portions of the upper pipe 20. The cushion attachment portions 32 are provided with wires for attachment of the back pad 18.

A back board 40 that serves as a seat back panel is disposed at the seat rear side of the upper pipe 20. The back board 40 is formed substantially in a board shape along the seat width direction between the seat width direction two end portions of the upper pipe 20. Thus, the whole of a rear face (a face at the seat rear side) of the upper pipe 20 is covered up.

The back board 40 is constituted of a resin to be resiliently deformable and lightweight. The back board 40 is not limited to resin; it is sufficient that the back board 40 can be formed to be resiliently deformable and lightweight. For example, the back board 40 may be constituted of a metal such as an aluminium alloy, a magnesium alloy, a titanium alloy or the like, or of a rubber or the like.

The back board 40 is disposed such that an upper end portion thereof is further to the seat upper side than the upper end portion of the upper pipe 20, which forms an upper end portion of the seat rear side of the seat back frame 12. An edge guard 48 fabricated of resin is disposed at an upper edge portion 42 (a seat upper side outer edge portion) of the back board 40. The edge guard 48 is formed along the seat width direction so as to cover the seat upper side of the upper edge portion 42 from the seat front side to the rear side thereof. A top portion 48A of the edge guard 48, which covers the upper end of the back board 40, is formed with a greater plate thickness than a general portion 48B of the edge guard 48, which covers the seat front side of the back board 40. The edge guard 48 is not limited to resin; it is sufficient that the back board 40 can be formed to be resiliently deformable and lightweight. The edge guard 48 may be constituted of a lightweight metal, a rubber or the like.

Figure 3:
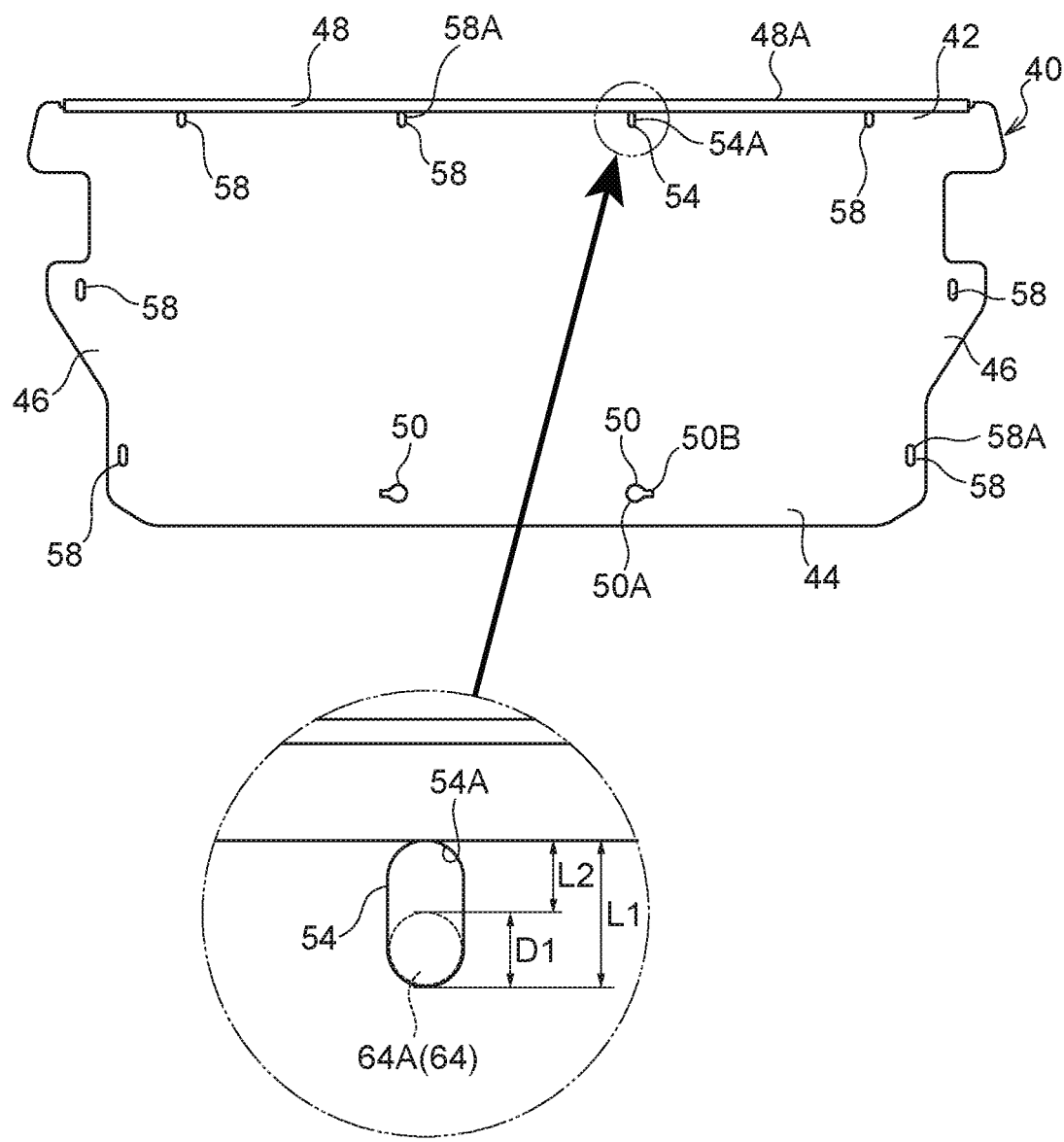
FIG. 3 is a rear view in which the seat back panel according to the present exemplary embodiment is seen from the vehicle rear side.

A plural number (two) of first attachment portions 50 are provided at a lower edge portion 44 (an outer edge portion at the seat lower side) of the back board 40. At each first attachment portion 50, a hole is formed penetrating in the plate thickness direction of the back board 40 (the seat front-and-rear direction) at a position that opposes one of the horizontal wire portions 28 in the front-and-rear direction. The plural (two) first attachment portions 50 are formed so as to be at substantially the same position in the seat vertical direction along the seat width direction. More specifically, a first hole portion 50A is formed at each first attachment portion 50. The first hole portion 50A includes a substantially circular aperture penetrating through the back board 40 in the plate thickness direction thereof. As illustrated in FIG. 3, a slot portion 50B is also formed penetrating through the back board 40 in the plate thickness direction. The slot portion 50B extends to a seat width direction outer side from a substantially central portion in the seat vertical direction of the seat width direction outer side of the first hole portion 50A. The slot portion 50B includes an aperture with a substantially rectangular shape in a seat elevation view. A length of the aperture of the slot portion 50B in the seat width direction is formed to be substantially the same as an outer diameter of a shaft portion 60B of a resin clip 60, which is described below.

The resin clips 60 are inserted into the first attachment portions 50 from the seat rear side, and the lower edge portion 44 of the back board 40 is attached to the horizontal wire portion 28 spanning across the upper pipe 20 via the resin clips 60.

Each resin clip 60 is attached to the horizontal wire portion 28 through the first hole portion 50A and is then slid along the horizontal wire portion 28 to the slot portion 50B side. Thus, the seat vertical direction position of the back board 40 attached to the horizontal wire portion 28 may be made stable. The aperture of each slot portion 50B extends in the seat width direction with a length greater than the outer diameter of the shaft portion 60B of the resin clip 60. Therefore, seat width direction positions of the resin clips 60 may be adjusted such that the back board 40 does not warp (does not resiliently deform) between the plural (two) first attachment portions 50 that are provided along the seat width direction.

Figure 4:
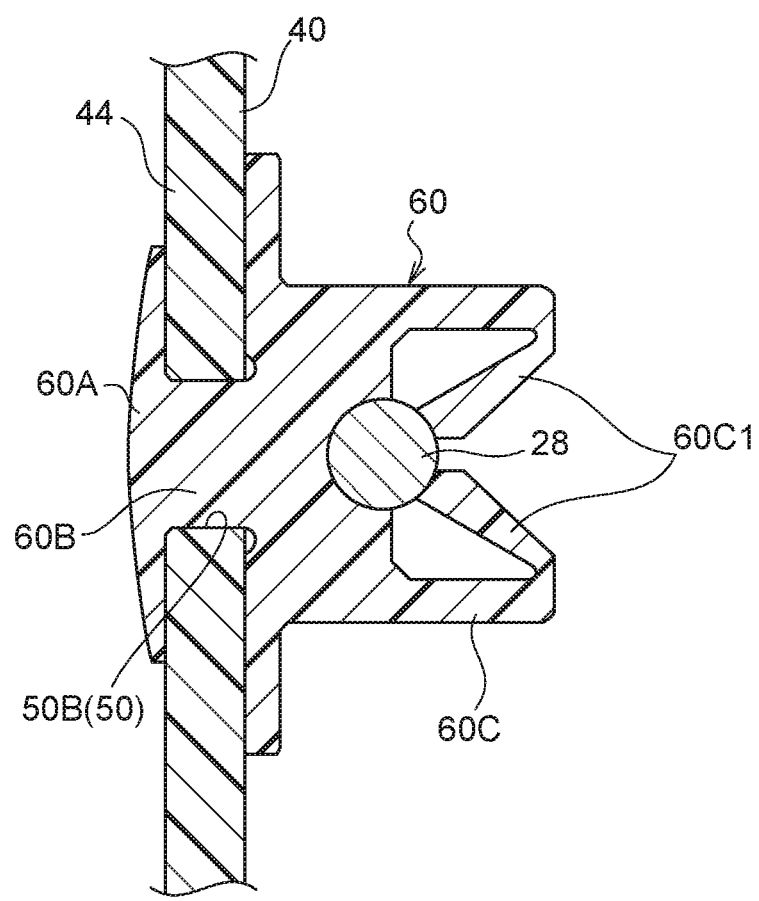
FIG. 4 is a sectional view of a resin clip, cut along line 4-4 shown in FIG. 1.

As shown in FIG. 4, each resin clip 60 is provided with a head portion 60A, the shaft portion 60B, and a retaining portion 60C. The shaft portion 60B extends in a shaft direction from the head portion 60A. The retaining portion 60C is formed to be resiliently deformable at a distal end portion of the shaft portion 60B.

The retaining portion 60C is provided with engaging portions 60C1 that extend from the distal end portion of the resin clip 60 toward the side thereof at which the head portion 60A is disposed, and are formed to be resiliently deformable. As a result of the resin clip 60 being inserted into the first attachment portion 50, the engaging portions 60C1 abut against the horizontal wire portion 28, resiliently deform, and open up to diametric direction outer sides of the shaft portion 60B. When the horizontal wire portion 28 has moved to an inner side of the retaining portion 60C (the side thereof at which the head portion 60A is disposed) and the horizontal wire portion 28 substantially ceases to abut against the engaging portions 60C1, the engaging portions 60C1 deform towards the diametric direction inner sides of the shaft portion 60B by resilient restoration. Hence, the resin clip 60 may retain the horizontal wire portion 28.

As shown in FIG. 3, a second attachment portion 54, which is for attachment of the back board 40 to the upper pipe 20, is provided in a region of the back board 40 that is distant in the seat vertical direction from the first attachment portion 50. More specifically, the second attachment portion 54 is provided at a region of the upper edge portion 42 (seat upper side outer edge portion) of the back board 40 that opposes the upper pipe 20. Separately from the second attachment portion 54, third attachment portions 58 for attachment of the back board 40 to the upper pipe 20 are provided at the upper edge portion 42 and seat width direction two end portions 46 of the back board 40, along regions of the back board 40 that oppose the upper pipe 20. The back board 40 is attached to the upper pipe 20 via the second attachment portion 54 and the third attachment portions 58, by being fixed with screws 64 that serve as fastening members.

As shown in FIG. 3, at the second attachment portion 54, a second hole portion 54A that serves as a hole is formed penetrating in the plate thickness direction of the back board 40. The second hole portion 54A is formed as a long hole including an aperture with a substantially rectangular shape in the seat elevation view. A length L1 of the aperture of the second hole portion 54A in the seat vertical direction is formed to be greater by a predetermined length L2 than an outer diameter D1 of a shaft portion 64A of each screw 64. Therefore, when a load toward the seat lower side acts on the upper edge portion 42 of the back board 40, the side of the back board 40 at which the upper edge portion 42 is disposed may be displaced to the seat lower side in accordance with the predetermined length L2 of the second hole portion 54A.

At each third attachment portion 58, a third hole portion 58A is formed penetrating in the plate thickness direction of the back board 40. The third hole portion 58A includes an aperture with a substantially rectangular shape in the seat elevation view. A length of the aperture of the third hole portion 58A in the seat vertical direction is formed to be greater by the predetermined length L2 than the outer diameter D1 of the shaft portion 64A of the screw 64. Therefore, when the load toward the seat lower side acts on the upper edge portion 42 of the back board 40, the side of the back board 40 at which the upper edge portion 42 is disposed may be displaced to the seat lower side in accordance with the length in the seat vertical direction of the aperture of the third hole portion 58A.

A length in the seat width direction of the aperture of the second hole portion 54A of the second attachment portion 54 is formed to be substantially the same as the outer diameter D1 of the shaft portion 64A of the screw 64, and is formed to be smaller than a length in the seat width direction of the aperture of the third hole portion 58A of each third attachment portion 58. Therefore, a seat width direction position of the back board 40 attached to the upper pipe 20 may be made stable via the second hole portion 54A.

The second attachment portion 54 and each third attachment portion 58 that is at the upper edge portion 42 side of the back board 40 are formed in regions near to the upper end of the back board 40. Therefore, a region from the seat upper side of the second attachment portion 54 and each third attachment portion 58 that is at the upper edge portion 42 side of the back board 40 to the upper end of the back board 40 is formed to be weaker than other regions of the back board 40.

Note that although attachment of the back board 40 to the upper pipe 20 by fixing with the screws 64 via the second attachment portion 54 and the third attachment portions 58 is described herein, this is not limiting. Attachment with alternative fastening members such as rivets or the like is possible.

—Operation and Effects—

Now, operation and effects of the present exemplary embodiment are described.

As shown in FIG. 5, during a frontal collision of the vehicle, a seat occupant P of a rear seat is moved such that their upper body tilts toward the seat front side. According to the inclination of the upper body of the seat occupant P, a head area H of the seat occupant P moves toward the vehicle seat 10 at the front seat side thereof and collides with the seat upper side of the seat back 14. As a result, a load from the head area H of the seat occupant P is applied to an action point PA at the seat upper side of the vehicle seat 10.

According to the vehicle seat 10 according to the present exemplary embodiment, the back board 40 is disposed at the seat rear side of the upper pipe 20 that constitutes the framework of the seat back 14. The seat vertical direction position of the back board 40 relative to the upper pipe 20 is determined by the resin clips 60 that are inserted into the first attachment portions 50 being attached to the horizontal wire portion 28. Thus, the upper end portion of the back board 40 is disposed at the seat upper side relative to the upper end portion of the upper pipe 20. The seat width direction position of the back board 40 relative to the upper pipe 20 is determined by the back board 40 being attached to the upper pipe 20 via the second attachment portion 54. Therefore, during the frontal collision, when the head area H of the seat occupant P on the rear seat who is moved to the seat front side makes contact with the back board 40, the head area H may make contact with the upper edge portion 42 while displacement of the back board 40 in the seat width direction is suppressed. Furthermore, because the edge guard 48 is provided, the seat vertical direction position of the upper end portion of the seat back 14 may be elevated, a plate thickness of the top portion 48A may be altered, and a timing at which the head area H of the seat occupant P makes contact with the back board 40 may be regulated. For these reasons, an impact against the head area H of the seat occupant P may be moderated compared to a situation in which the head area H of the seat occupant P on the rear seat first makes contact with the upper pipe 20.

According to the vehicle seat 10 according to the present exemplary embodiment, the length L1 in the seat vertical direction of the apertures in the back board 40 of the second hole portion 54A of the second attachment portion 54 and the third hole portions 58A of the third attachment portions 58 is formed to be greater than the outer diameter D1 of the shaft portions 64A of the screws 64 that are for attachment to the upper pipe 20. Therefore, when the head area H of the seat occupant P makes contact with the upper end portion of the back board 40, the back board 40 may be displaced in the seat vertical direction. As a result, an impact that the head area H of the seat occupant P on the rear seat receives may be moderated.

According to the vehicle seat 10 according to the present exemplary embodiment, the region of the back board 40 from the second attachment portion 54 and each third attachment portion 58 that is at the upper edge portion 42 side of the back board 40 to the upper end of the back board 40 is formed to be weaker than other regions of the back board 40. Moreover, the deformable resin clips 60 are attached to the horizontal wire portion 28 at the first attachment portions 50. Therefore, the back board 40 with which the head area H of the seat occupant P makes contact may be displaced to the seat lower side and may be detached from the upper pipe 20. Thus, a reaction force against the head area H of the seat occupant P from the back board 40 may be more assuredly suppressed.

The vehicle seat 10 according to the present exemplary embodiment is structured simply by providing the back board 40 at the seat rear side of the seat back frame 12. Therefore, the vehicle seat 10 that is structured both suppresses an increase in a number of components and may moderate an impact that the head area H of the seat occupant P on the rear seat receives.

As described above, the vehicle seat 10 according to the present exemplary embodiment both suppresses an increase in a number of components and may moderate an impact received by the head area H of the seat occupant P of the rear seat.

First Variant Example and Second Variant Example

Figure 6A:
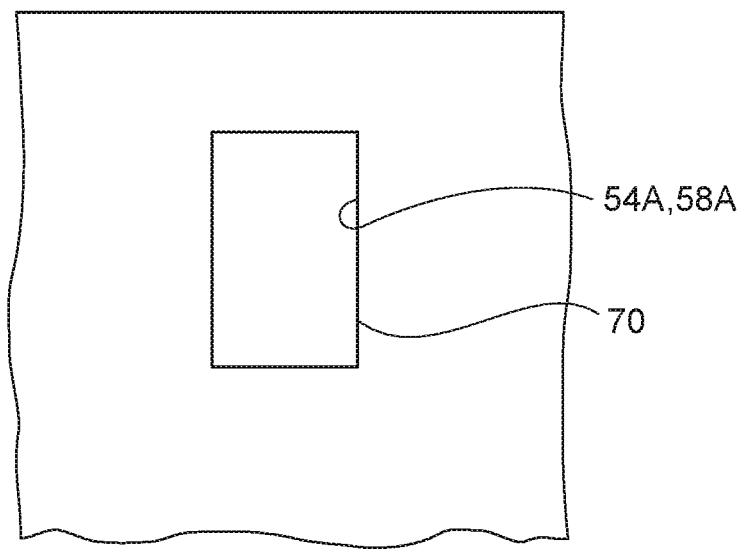
FIG. 6A is a first variant example of a hole portion according to the present exemplary embodiment.
Figure 6B:
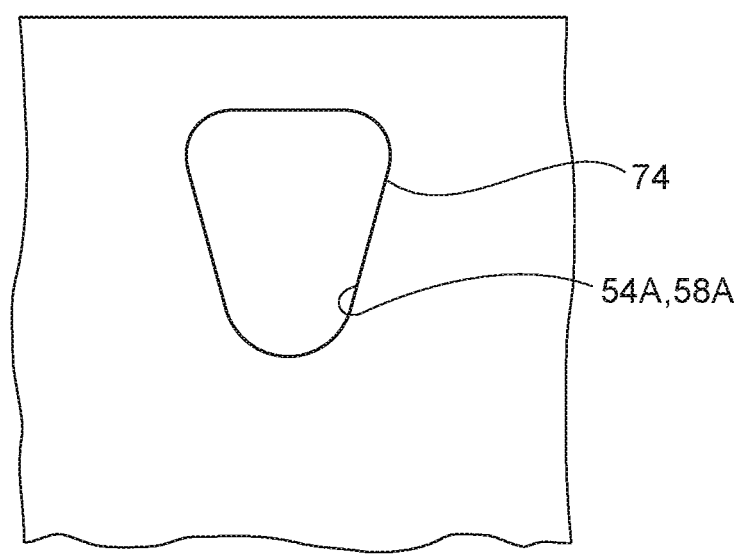
FIG. 6B is a second variant example of the hole portion according to the present exemplary embodiment.

Now, a first variant example and a second variant example of the holes according to the present exemplary embodiment are described using FIG. 6A and FIG. 6B. Structural portions that are the same as in the present exemplary embodiment described above are assigned the same reference symbols, and descriptions thereof are not given.

As shown in FIG. 6A, an aperture 70 of the second hole portion 54A and aperture 70 of each third hole portion 58A, which serve as holes according to the first variant example, are formed in square shapes in the seat elevation view. As shown in FIG. 6B, an aperture 74 of the second hole portion 54A and aperture 74 of each third hole portion 58A, which serve as holes according to the second variant example, are formed in inverted triangle shapes in the seat elevation view.

According to the first variant example and the second variant example, lengths in the seat vertical direction of the apertures 70 and 74 at the second hole portion 54A of the second attachment portion 54 and the third hole portions 58A of the third attachment portions 58 are formed to be longer than the outer diameter D1 of the shaft portions 64A of the screws 64 for attachment to the upper pipe 20. Therefore, when the head area H of the seat occupant P makes contact with the upper end portion of the back board 40, the back board 40 may be displaced in the seat vertical direction. As a result, an impact that the head area H of the seat occupant P on the rear seat receives may be moderated.

Third to Fifth Variant Examples

Figure 6C:
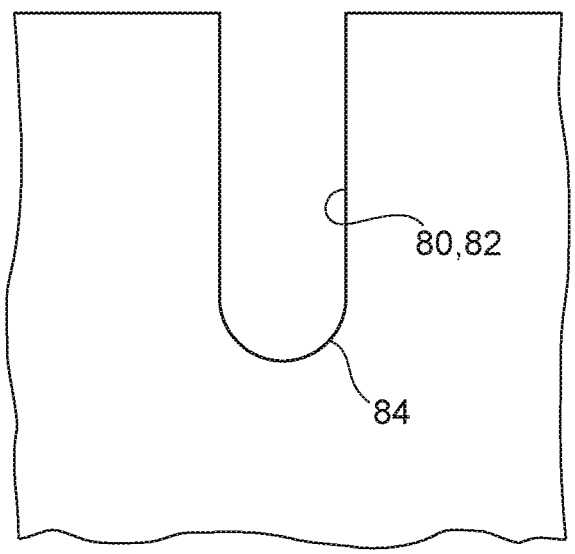
FIG. 6C is a third variant example of the hole portion according to the present exemplary embodiment.
Figure 6D:
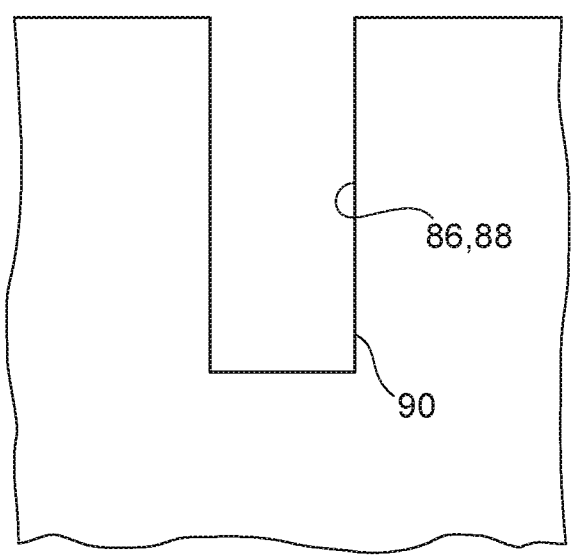
FIG. 6D is a fourth variant example of the hole portion according to the present exemplary embodiment.
Figure 6E:
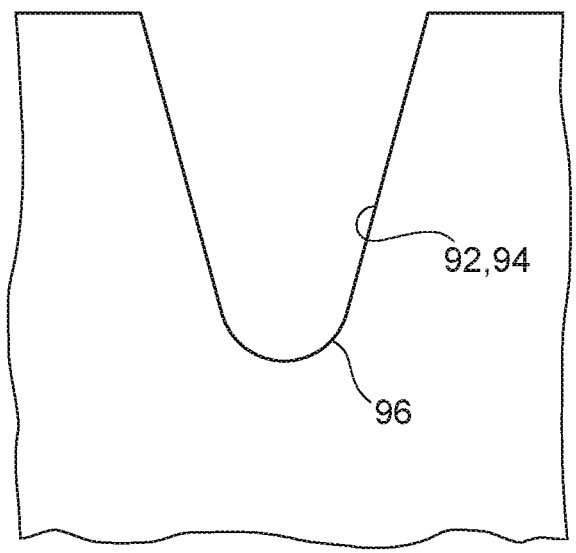
FIG. 6E is a fifth variant example of the hole portion according to the present exemplary embodiment.

Now, third to fifth variant examples of the holes according to the present exemplary embodiment are described using FIG. 6C, FIG. 6D and FIG. 6E. Structural portions that are the same as in the present exemplary embodiment described above are assigned the same reference symbols, and descriptions thereof are not given.

As shown in FIG. 6C, a second hole portion 80 and third hole portions 82, which serve as holes according to the third variant example, are formed by incision of the upper end of the back board 40. Each of the second hole portion 80 and third hole portions 82 is formed substantially in a U shape in the seat elevation view, with an aperture 84 opening to the seat upper side. A second hole portion 86 and third hole portions 88 shown in FIG. 6D, which serve as holes according to the fourth variant example, are also formed by incision of the upper end of the back board 40. Each of the second hole portion 86 and third hole portions 88 is formed substantially in a rectangular shape in the seat elevation view, with an aperture 90 opening to the seat upper side. A second hole portion 92 and third hole portions 94 shown in FIG. 6E, which serve as holes according to the fifth variant example, are also formed by incision of the upper end of the back board 40. Each of the second hole portion 92 and third hole portions 94 is formed substantially in a V shape in the seat elevation view, with an aperture 96 opening to the seat upper side.

According to the holes 80, 82, 86, 88, 92 and 94 according to the present variant examples, the back board 40 may be assuredly detached from the upper pipe 20 when the head area H of the seat occupant P has made contact therewith and the back board 40 has displaced to the seat lower side. Thus, a reaction force against the head area H of the seat occupant P from the back board 40 may be more assuredly suppressed.

Sixth Variant Example

Figure 6F:
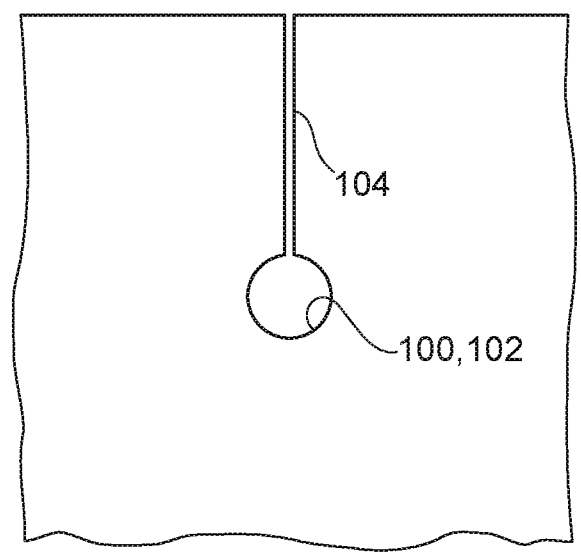
FIG. 6F is a sixth variant example of the hole portion according to the present exemplary embodiment.

Now, a sixth variant example of the holes according to the present exemplary embodiment is described using FIG. 6F. Structural portions that are the same as in the present exemplary embodiment described above are assigned the same reference symbols, and descriptions thereof are not given.

At a second hole portion 100 and third hole portions 102, which serve as holes according to the present variant example, slot portions 104 are formed. Each slot portion 104 is incised from the seat upper side of the hole portion 100 or 102 to the upper end of the back board 40.

According to the holes 100 and 102 according to the present variant example, the back board 40 may be assuredly detached from the upper pipe 20 when the head area H of the seat occupant P has made contact therewith and the back board 40 has displaced to the seat lower side. Thus, a reaction force against the head area H of the seat occupant P from the back board 40 may be more assuredly suppressed.

Seventh Variant Example

Figure 7:
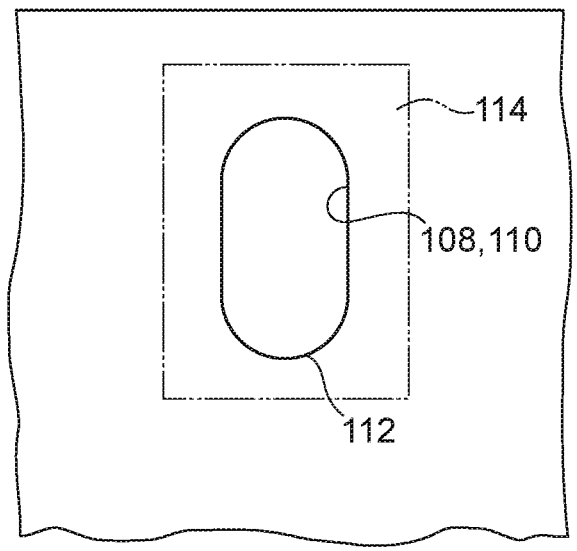
FIG. 7 is a seventh variant example of the hole portion according to the present exemplary embodiment.

Now, a seventh variant example of the holes according to the present exemplary embodiment is described using FIG. 7. Structural portions that are the same as in the present exemplary embodiment described above are assigned the same reference symbols, and descriptions thereof are not given.

Weakened portions 114 are formed at outer periphery portions of apertures 112 of a second hole portion 108 and third hole portions 110, which serve as holes according to the present variant example. At each weakened portion 114, stiffness is reduced by, for example, the plate thickness being formed to be thinner than in other regions of the back board 40, plural holes being penetratingly formed or the like.

According to the holes 108 and 110 according to the present variant example, because the weakened portions 114 are provided at the back board 40, the back board 40 may be assuredly detached from the upper pipe 20 when the head area H of the seat occupant P has made contact therewith and the back board 40 has displaced to the seat lower side. Thus, a reaction force against the head area H of the seat occupant P from the back board 40 may be more assuredly suppressed.

What is claimed is:

1. A vehicle seat comprising:
   a seat back frame standing from a seat rear end side of a seat cushion that supports a buttock area and thigh area of a seat occupant, a left and right pair of cushion frames structuring a framework of the seat cushion, the seat back frame being supported to be tiltable in a seat front-and-rear direction about a center of rotation at a side of the seat back frame at which a connection portion thereof with the cushion frames is disposed, and the seat back frame structuring a framework of a seat back that supports a back area of the seat occupant; and a seat back panel that is provided at the seat rear side of the seat back frame; an upper frame structuring an upper end portion at the seat rear side of the seat back frame, an upper end portion of the seat back panel being disposed at the seat upper side relative to the upper frame and being coupled to the upper frame, and the upper end portion of the seat back panel displacing toward the seat lower side when an impact load is applied from the upper side of the seat back.

2. The vehicle seat according to claim 1, wherein the seat back panel detaches from the seat back frame when the seat back panel displaces toward the seat lower side.

3. The vehicle seat according to claim 1, wherein the seat back panel includes a first attachment portion that, as a result of being attached to the seat back frame, disposes the upper end portion of the seat back panel at the seat upper side relative to the upper frame.

4. The vehicle seat according to claim 1, wherein the seat back panel includes a second attachment portion that, as a result of being attached to the seat back frame, sets a seat width direction position of the seat back panel relative to the seat back frame.

5. The vehicle seat according to claim 4, wherein the seat back panel is attached to the seat back frame by a fastening member being inserted into a hole formed in the second attachment portion, the hole being formed as a long hole with a length in the seat vertical direction that is greater than an outer diameter of a shaft portion of the fastening member.

6. The vehicle seat according to claim 3, wherein the seat back panel is attached to the seat back frame by a resin clip, a shaft portion of the resin clip being inserted into the first attachment portion, the resin clip including a retention portion at a distal end of the shaft portion, the retention portion retaining a wire that spans across the seat back frame in the seat width direction, and the resin clip detaching from the wire by resilient deformation when the seat back panel displaces toward the seat lower side.

7. The vehicle seat according to claim 1, wherein an edge guard is provided at an outer edge portion at the seat upper side of the seat back panel, the edge guard being disposed along the seat width direction so as to cover the outer edge portion, a top portion of the edge guard covering an upper end of the seat back panel, a general portion of the edge guard covering the seat front side of a portion of the seat back panel, and the top portion being formed with a greater plate thickness than the general portion.

8. The vehicle seat according to claim 5, wherein the hole is formed in a square shape in a seat elevation view.

9. The vehicle seat according to claim 5, wherein the hole is formed in an inverted triangle shape in a seat elevation view.

10. The vehicle seat according to claim 5, wherein the hole is formed in a U shape in a seat elevation view by incision of the upper end of the seat back panel, the hole opening to the seat upper side.

11. The vehicle seat according to claim 5, wherein the hole is formed in a V shape in a seat elevation view by incision of the upper end of the seat back panel, the hole opening to the seat upper side.

* * * * *